A. M. GLOSSBRENNER.
SAVINGS BANK RECORD.
APPLICATION FILED FEB. 7, 1916.

1,216,562.

Patented Feb. 20, 1917.

Fig. 1.

| \multicolumn{8}{|c|}{MEMBER'S CARD No._____} |
| \multicolumn{8}{|c|}{Total Am't $25.50  Class "J-100"} |
| DATE | PAY. NO. | AM'T PAID | AM'T DUE | DATE | PAY. NO. | AM'T PAID | AM'T DUE |
|---|---|---|---|---|---|---|---|
| JAN. 3 | 1 | 1.00 | 24.50 | JUNE 26 | 26 | 19.50 | 6.00 |
| JAN. 10 | 2 | 1.98 | 23.52 | JULY 3 | 27 | 19.98 | 5.52 |
| JAN. 17 | 3 | 2.94 | 22.56 | JULY 10 | 28 | 20.44 | 5.06 |
| JAN. 24 | 4 | 3.88 | 21.62 | JULY 17 | 29 | 20.88 | 4.62 |
| JAN. 31 | 5 | 4.80 | 20.70 | JULY 24 | 30 | 21.30 | 4.20 |
| FEB. 7 | 6 | 5.70 | 19.80 | JULY 31 | 31 | 21.70 | 3.80 |
| FEB. 14 | 7 | 6.58 | 18.92 | AUG. 7 | 32 | 22.08 | 3.42 |
| FEB. 21 | 8 | 7.44 | 18.06 | AUG. 14 | 33 | 22.44 | 3.06 |
| FEB. 28 | 9 | 8.28 | 17.22 | AUG. 21 | 34 | 22.78 | 2.72 |
| MAR. 6 | 10 | 9.10 | 16.40 | AUG. 28 | 35 | 23.10 | 2.40 |
| MAR. 13 | 11 | 9.90 | 15.60 | SEPT. 4 | 36 | 23.40 | 2.10 |
| MAR. 20 | 12 | 10.68 | 14.82 | SEPT. 11 | 37 | 23.68 | 1.82 |
| MAR. 27 | 13 | 11.44 | 14.06 | SEPT. 18 | 38 | 23.94 | 1.56 |
| APR. 3 | 14 | 12.18 | 13.32 | SEPT. 25 | 39 | 24.18 | 1.32 |
| APR. 10 | 15 | 12.90 | 12.60 | OCT. 2 | 40 | 24.40 | 1.10 |
| APR. 17 | 16 | 13.60 | 11.90 | OCT. 9 | 41 | 24.60 | .90 |
| APR. 24 | 17 | 14.28 | 11.22 | OCT. 16 | 42 | 24.78 | .72 |
| MAY 1 | 18 | 14.94 | 10.56 | OCT. 23 | 43 | 24.94 | .56 |
| MAY 8 | 19 | 15.58 | 9.92 | OCT. 30 | 44 | 25.08 | .42 |
| MAY 15 | 20 | 16.20 | 9.30 | NOV. 6 | 45 | 25.20 | .30 |
| MAY 22 | 21 | 16.80 | 8.70 | NOV. 13 | 46 | 25.30 | .20 |
| MAY 29 | 22 | 17.38 | 8.12 | NOV. 20 | 47 | 25.38 | .12 |
| JUNE 5 | 23 | 17.94 | 7.56 | NOV. 27 | 48 | 25.44 | .06 |
| JUNE 12 | 24 | 18.48 | 7.02 | DEC. 4 | 49 | 25.48 | .02 |
| JUNE 19 | 25 | 19.00 | 6.50 | DEC. 11 | 50 | 25.50 | |

Fig. 2.

Witnesses:
Frank A. Fahle
Josephine Gasper

Inventor
Alfred M. Glossbrenner,
By
Hood & Schley
Attorneys

UNITED STATES PATENT OFFICE.

ALFRED M. GLOSSBRENNER, OF INDIANAPOLIS, INDIANA, ASSIGNOR TO LEVEY BROS. & COMPANY, OF INDIANAPOLIS, INDIANA, A CORPORATION OF INDIANA.

SAVINGS-BANK RECORD.

1,216,562.   Specification of Letters Patent.   Patented Feb. 20, 1917.

Application filed February 7, 1916. Serial No. 76,550.

*To all whom it may concern:*

Be it known that I, ALFRED M. GLOSSBRENNER, a citizen of the United States, residing at Indianapolis, in the county of Marion and State of Indiana, have invented a new and useful Savings-Bank Record, of which the following is a specification.

In order to stimulate savings accounts, many savings banks have made provisions by which depositors may accumulate comparatively small amounts by repeated small deposits during an extended period, as, for instance, accumulation of Christmas funds by deposits made weekly during fifty weeks preceding Christmas. If each such account required the usual methods of bookkeeping, the clerical labor required would cost far in excess of any benefit resulting to the bank from such accounts, and such expense would probably offset any benefits arising from other and larger accounts stimulated by such methods.

The object of my present invention is, therefore, to provide record cards of such character that, one being held by the bank and the other by the depositor, they may be simultaneously punched at the time of each deposit in such manner as to give to the depositor a legible record of the deposit and to the bank a record of the deposit adjacent a space in which can be inserted the date of deposit, this bank-retained record being in the form of a card and the only one made by the bank, so far as the individual deposit is concerned. At the close of each day's banking, the total receipts in any class, or, if desired, the total receipts in all classes, may be carried as a single item upon the general books of record of the bank, it being possible at all times, whenever necessary, to check any individual record card in the possession of the bank.

The invention consists primarily in the provision of two cards, each of which carries upon its face a list of the number and amount of the various required payments and the times when the same are due, and also a series of blank spaces, those on the depositor's card being arranged to receive the punching, and those on the bank's card being arranged to receive a date mark, indicating date of payment, the two cards being so proportioned and the markings thereon being so arranged that when one is placed upon the other in a specified manner, a punch operating simultaneously through both cards may serve to place the punchings in a proper manner so as to leave the blank space free upon the bank's card, and to perforate the blank space of the depositor's card, so as not to destroy the data on said depositor's card.

The accompanying drawings illustrate my invention. Figure 1 is a face view of the member's card, the data thereon being that for a particular class, wherein the initial deposit is one dollar, and the amount of required deposit decreases two cents each week; Fig. 2 is a face view of the bank's record card for the same class.

It is to be understood of course, that the data on the cards will vary according to the class.

In the drawings, the member's card is shown as consisting of two portions foldable upon each other on the transverse line 10. The portion 11 is not an essential portion but is desirable for the purpose of carrying upon an unmarred portion complete data relative to the class. The other portion 12, which is the essential portion of the card, has upon its face a series of divisions corresponding to the calendar months. In turn, each of these divisions is sub-divided into a series of pairs of divisions 14 and 15, there being five pairs of such divisions to take care of the possible number of weekly payments periods in any month. The several divisions 14 corresponding to payment dates will be consecutively numbered from 1 to 50, and will also carry an indication of the amount which is due for that particular period. Each space 15 will be blank.

The bank record card 16 will have a portion 17 for the reception of the name and address of the depositor; another portion will be divided into a series of monthly divisions corresponding in size and arrangement to the monthly divisions on card 12, and these divisions will be again subdivided into pairs of divisions 14′ and 15′, corresponding in size and arrangement to the divisions 14 and 15 of card 12. All of the divisions 14′ will be blank and adapted to receive a date mark, as indicated at the left of Fig. 2. The proper divisions 15′ will be consecutively numbered to correspond with the numbering of divisions 14 of card 12 and these divisions will carry data corresponding to the data on divisions 14.

In use, card 16 will be placed upon card 12 in such manner as to bring the divisions 14' into registry with divisions 14 of card 12, and divisions 15' into registry with divisions 15. Thereupon, a punching 19 will be made through the two cards, to indicate any particular deposit. This punching will substantially destroy the data in space 15' but will leave untouched the data in space 14, the punching passing through space 15. The depositor is, therefore, at all times fully and accurately advised of the condition of his deposit, without the need of inquiry.

I claim as my invention:

A bank deposit record, comprising a pair of coöperating cards which may be coördinately, one for the bank and one for the depositor, each of which has upon its face a series of divisions corresponding to the calendar months and registrable by superposition, said divisions upon the depositor's card carrying in spaced relationship data relative to successive time periods and also having portions adjacent each datum blank as regards such data, and the bank's card having in its monthly divisions successive blank portions offset relative to the blank portions of the first-mentioned card when the two cards are registered, whereby the two cards may be registered and simultaneously punched, the punchings being thereby formed in a blank space of the depositor's card and adjacent a corresponding blank space of the bank's card.

In witness whereof, I have hereunto set my hand at Indianapolis, Indiana, this third day of February, A. D. one thousand nine hundred and sixteen.

ALFRED M. GLOSSBRENNER.

Copies of this patent may be obtained for five cents each, by addressing the "Commissioner of Patents, Washington, D. C."